United States Patent
Ballentine et al.

[15] 3,698,257
[45] Oct. 17, 1972

[54] LEAD SCREW AND NUT

[72] Inventors: John W. Ballentine, Manhattan Beach; Frank R. Chaffin, Thousand Oaks, both of Calif.

[73] Assignee: U.S. Shamban & Co., Los Angeles, Calif.

[22] Filed: Jan. 25, 1971

[21] Appl. No.: 109,490

[52] U.S. Cl. ............................74/424.8 R, 74/409
[51] Int. Cl. ............................F16h 1/18, F16h 55/18
[58] Field of Search..........74/441, 409, 459, 424.8 R

[56] References Cited
UNITED STATES PATENTS

| | | | |
|---|---|---|---|
| 3,081,644 | 3/1963 | Hudgens et al. | 74/459 X |
| 3,190,132 | 6/1965 | Lyon, Jr. | 74/441 X |

*Primary Examiner*—Leonard H. Gerin
*Attorney*—Smyth, Roston & Pavitt

[57] ABSTRACT

An assembly comprising a lead screw having external threads and a nut having internal threads. The nut receives the screw with the internal and external threads forming an interference fit. The threads of at least one of the nut and screw are somewhat deformable.

16 Claims, 6 Drawing Figures

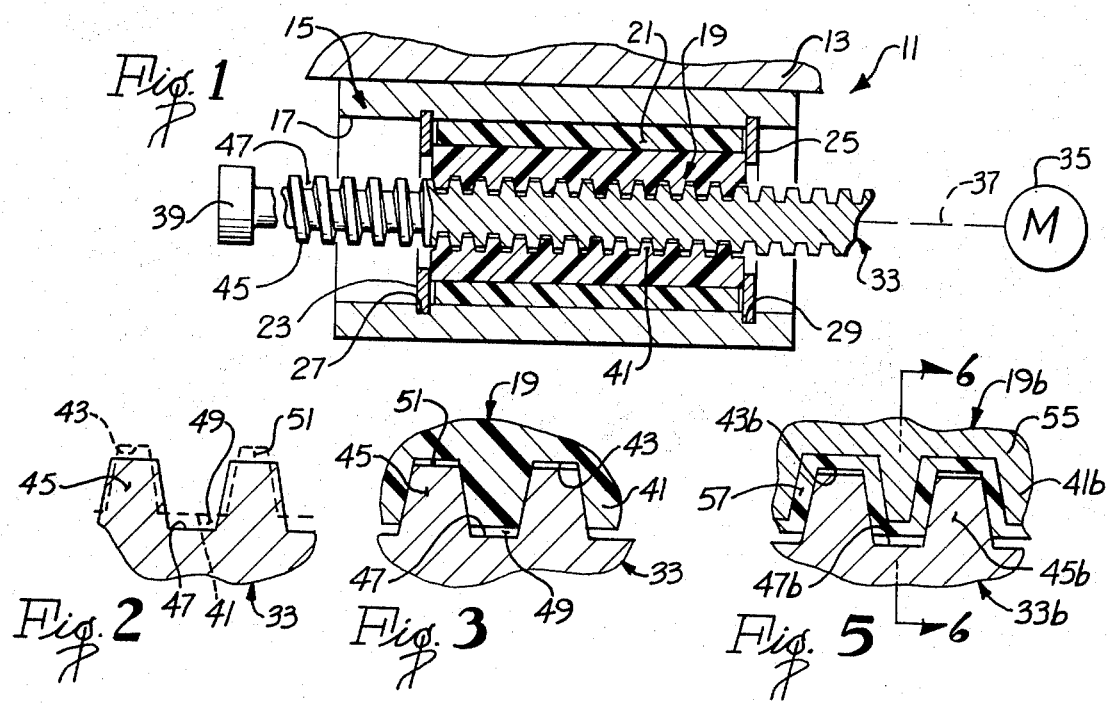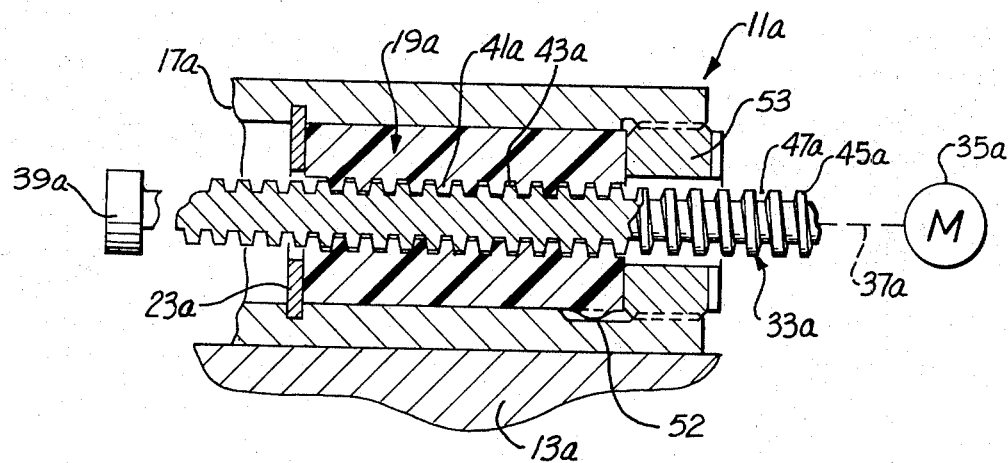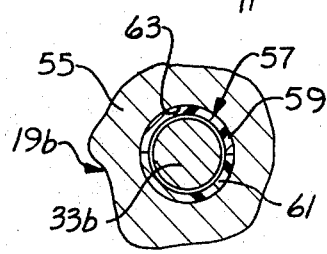

LEAD SCREW AND NUT

BACKGROUND OF THE INVENTION

Many positioning devices such as those used with machine tools use Acme screws. An Acme screw includes a cooperating nut and screw each of which has Acme threads which cooperate to transmit power.

In order to provide for production errors, temperature changes, etc., it is necessary to design the Acme screw with a certain amount of backlash. Backlash is very undesirable because it reduces the accuracy of the positioning device. Ball screw actuators are also used in positioning devices; however, they are relatively expensive and relatively difficult to assemble.

SUMMARY OF THE INVENTION

The present invention eliminates the problems experienced heretofore with Acme screws without the expense and complexity of a ball screw actuator. This is accomplished by using an interference fit to eliminate backlash and by constructing the threads of the nut and/or the screw in accordance with the teachings of this invention.

The conventional Acme screw is constructed of metal and an interference fit between the threads of the nut and screw is not possible because the metal would gall, and it would be extremely difficult to turn the screw relative to the nut. With the present invention an interference fit can be used because the threads of the nut and/or screw are constructed of a somewhat deformable material. Under the load imposed by the interference fit, the material of the somewhat deformable threads cold flows slightly with the result that the interference fit eliminates backlash, but does not impose as severe forces on the threads as if the threads were constructed of relatively nondeformable material such as metal.

The material used for the somewhat deformable threads can advantageously include a mixture of a flowable plastic such as polytetrafluoroethylene and a finely divided metal such as bronze with the plastic serving as the binder. Although a plastic such as a fluoroplastic could be used alone, the addition of a metal such as bronze materially increases the resistance to wear. Although other somewhat deformable materials can be used, the preferred materials are sold under the trademarks Turcite A and Turcite B by W. S. Shamban & Company, Los Angeles, California. Turcite A is a mixture of thermoplastic, bronze and polytetrafluoroethylene. Turcite B is a mixture of polytetrafluoroethylene and bronze with a small percentage by weight of additives which impart certain desirable characteristics.

All materials are deformable to some degree. Reference herein to "somewhat deformable" is not intended to include relatively nondeformable materials such as steel and other relatively stiff metals. On the other hand, the assembly of this invention is adapted to transmit power, and as such, soft, readily deformable materials such as soft elastomeric materials are unsuited for thread construction. Accordingly, "somewhat deformable" as used herein excludes soft, readily deformable elastomers such as materials conventionally used for O-ring seals.

The nut and/or the screw and/or portions thereof can be constructed of the relatively deformable material. For transmitting substantial power, it is preferred to construct the nut or at least a peripheral segment thereof of the somewhat deformable material and to construct the lead screw of a harder, stronger material such as steel. The reason for this is that it is more difficult to obtain the requisite strength in the screw than in the nut. The entire nut may be constructed of the somewhat deformable material or the nut may include a core of relatively nondeformable material such as steel and a lining of the somewhat deformable material.

The interference fit can be obtained in a number of ways. First, the threads as initially formed and under no load may be sized for the interference fit. Alternatively, the threads as initially constructed may be sized for a snug fit and the somewhat deformable material preloaded and confined to cause sufficient cold flow of the somewhat deformable material to create an interference fit. Of course, these two methods of obtaining an interference fit can be combined, i.e., the threads as initially formed can be sized for the interference fit and then preloaded.

The degree or amount of interference between the threads can be selected to meet specific requirements. Generally, it will be desirable to increase the amount of interference, i.e., make the fit between threads tighter, as the load which the assembly is to transmit increases. Thus, for higher loads, it is preferred to form the threads initially for a predetermined amount of interference and then to preload to augment the interference obtained through the initial sizing of the threads.

The nut member may be preloaded axially and/or radially. To obtain a radial preload, the nut may be forced within a rigid enclosure. If only a lining of the somewhat deformable material is used, preloading can be accomplished by appropriately confining split sections of the lining. To accommodate for misalignment of the axes of the nut and the rigid member and to compensate for surface irregularities of the nut and the rigid enclosure, a soft resilient deformable sleeve of elastomeric material or the like may be provided between the nut and the rigid enclosure.

Although a nut constructed in accordance with the teachings of this invention can be used in many different environments, it is particularly adapted for use in a positioning device. Such a positioning device may include a lead screw cooperating with the nut as described hereinabove and means such as a motor for rotating the lead screw relative to the nut to cause the nut to translate along the screw. A driven member such as a carriage is drivingly connected to the nut for translation therewith.

The invention can best be understood by reference to the following description taken in connection with the accompanying illustrative drawing.

BRIEF DESCRIPTION OF THE DRAWING

FIG. 1 is a fragmentary sectional view through a preloaded nut and screw assembly adapted to transmit power and motion from a motor to a carriage.

FIG. 2 is an enlarged fragmentary sectional view showing diagrammatically a preferred size relationship between the teeth of the nut and screw under no load conditions.

FIG. 3 is an enlarged fragmentary sectional view showing the interference fit between the threads of the nut and screw.

FIG. 4 is a fragmentary sectional view similar to FIG. 1 of a second embodiment of the present invention illustrating another way to obtain an axial preload on the nut.

FIG. 5 is a fragmentary sectional view similar to FIG. 3 showing another embodiment of the invention in which the nut includes a relatively nondeformable core and a sheath of somewhat deformable material.

FIG. 6 is a fragmentary sectional view taken generally along line 6—6 of FIG. 5.

DESCRIPTION OF THE PREFERRED EMBODIMENT

FIG. 1 shows a positioning device 11 for positioning a driven member such as a carriage 13. The positioning device 11 includes a rigid tube 15 suitably affixed to the carriage 13 and having a passage 17 therein of circular or other suitable cross section. A nut 19 is mounted in coaxial relationship with the tube 15 by a sleeve 21 of soft, resilient, deformable material such as an elastomeric material. The sleeve may be unsplit or split in the axial direction. The nut 19 is retained against axial movement relative to the tube 15 by retaining rings 23 and 25 retained in annular grooves 27 and 29, respectively, formed in the tube 15. The end faces of the nut 19 bears directly against the retaining rings 23 and 25.

A lead screw 33 is received within the nut 19 and is coupled to a motor 35 or other suitable power source by any appropriate driving connection 37. The lead screw 33 is held against translation by one or more bearings 39 and the nut 19 is held against rotation relative to the tube 15 by bonding the sleeve 21 to the tube and to the nut. Accordingly, when the screw 33 is rotated by the motor 35, the nut 19 is caused to translate therealong. As the nut is fixed relative to the carriage 13, the carriage moves with the nut.

Considering next the specific construction of the nut 19 and the lead screw 33, the nut 19 has an internal helical rib 41 (FIG. 3) which defines an internal helical groove 43. Similarly, the lead screw 33 has an external helical rib 45 which defines an external helical groove 47. The lead screw 33 is constructed of a strong relatively nondeformable material such as steel, and the nut 19 is constructed of a somewhat deformable material such as Turcite B. As shown in FIG. 3, the ribs 41 and 45 are received in driving relationship by the grooves 47 and 43, respectively. The fit between the ribs 41 and 45 is an interference fit.

FIG. 2 is a diagrammatic representation illustrating the relative sizes of the ribs and grooves prior to assembly and under a no-load condition. FIG. 2 is not drawn to scale. From FIG. 2 it can be seen that the rib 41 has a greater axial dimension than the groove 47 into which it is to be received. Similarly, the rib 45 has a longer axial dimension than the groove 43 into which it is to be received. These relative axial dimensions are exaggerated in FIG. 2 for clarity. The orientation of the ribs 41 and 45 is such as to provide helical gaps 49 and 51.

With the nut 19 and the lead screw 33 assembled as shown in FIG. 3, the ribs 41 and 45 engage relatively tightly to form an interference fit as a result of the axial dimensions of the ribs and grooves as shown in FIG. 2. The assembly of the nut 19 on the lead screw 33 results in substantially no deformation of the rib 45 because the rib 45 has greater stiffness than the rib 41. The nut 19 which is constructed of somewhat deformable material yields under pressure as a result of assembling the nut and screw. The yielding of the material of the nut 19 reduces some of the stresses; however, the interference fit is preserved to thereby eliminate backlash. The manner in which the nut 19 deforms will depend upon the magnitude of the stresses and the nature and degree of confinement of the nut. However, some of the material of the nut 19 may cold flow so as to reduce the radial dimensions of the gaps 49 and 51.

The construction shown in FIG. 1 can be used to preload the nut 19 to thereby create or augment the interference between the ribs 41 and 45. Preloading is desirable when relatively heavy loads are to be transmitted. Preloading can be axial and/or radial. The nut 19 can be axially preloaded between the retaining rings 23 and 25. In addition, the nut 19 can be radially preloaded by the tube 15 and the sleeve 21.

Preloading of this type tends to cause tighter engagement between the ribs 41 and 45. In addition, the sleeve 21 facilitates assembly when there is some misalignment between the nut 19 and the tube 15. With the construction shown in FIGS. 1-3, backlash is eliminated even though substantial power is transmitted from the motor 35 through the lead screw 33 and the nut 19 to the carriage 13.

FIG. 4 shows a positioning device 11a which is identical to the positioning device 11 except for the preloading means and except for the position of the carriage 13a. Parts in FIG. 4 corresponding to parts in FIG. 1 are designated by corresponding reference numerals followed by the letter a.

In FIG. 4, a motor 35a transmits power through a driving connection 37a to rotate a lead screw 33a. A nut 19a is snugly received in and surrounded by a tube 17a which has the carriage 13a mounted on the lower side thereof. One or more radial projection or keys 52 and/or an adhesive holds the nut 19a against rotation relative to the tube 17a. Ribs 41a and 45a on the nut 19a and screw 33a, respectively, engage to form an interference fit.

The nut 19a is axially preloaded between a retaining ring 23a and a preloading stud 53 which is threaddedly received in one end of the tube 17a. Structurally the embodiment of FIG. 4 is identical to the embodiment of FIGS. 1-3 except the sleeve 21 has been eliminated and the key 52 and the stud 53 have been substituted for bonding and for the retaining ring 25. The amount of axial preload on the nut 19a can be adjusted by screwing the stud 53 into or out of the tube 17a. The nut 19a is not radially preloaded. When the nut 19a is axially preloaded, the deformation thereof radially outwardly is limited by the rigid tube 17a, and accordingly, at least some of the preload forces applied thereto are operative to create or augment an interference fit between the ribs 41a and 45a. Thus, backlash between the nut 19a and the lead screw 33a is eliminated.

FIG. 5 shows a modified nut 19b which can be used in either the embodiment of FIGS. 1-3 or the embodiment of FIG. 4. The nut 19b includes a core 55 of steel or other relatively nondeformable material and a lining 57 of somewhat deformable material such as Turcite B. The nut 19b has a continuous helical rib 41b which is made up partially of the core 55 and partially of the lining 57. The rib 41b defines a continuous internal groove 43b.

The nut 19b cooperates with a lead screw 33b which may be identical to the lead screw 33. The lead screw 33b has a continuous external helical rib 45b which defines a continuous external helical groove 47b. The ribs 41b and 45b are received within the grooves 47b and 43b, and there is an interference fit between the ribs as described in connection with FIGS. 1–3. To preload the lining 57, the lining preferably includes half sections 59 and 61 which are oversized circumferentially in relation to the circumferential dimension of the cavity 63 in the core 55 in which the sections 59 and 61 are placed. This preloads the sections 59 and 61 circumferentially to provide or augment the interference fit between the ribs 41b and 45b. The preloading mechanisms of FIGS. 1 and 4 may be utilized as retaining means rather than as preloading means when the nut member 19b (FIG. 5) is used.

Although exemplary embodiments of the invention have been shown and described, many changes, modifications, and substitutions may be made by one having ordinary skill in the art without necessarily departing from the spirit and scope of this invention.

We claim:

1. An assembly comprising:
   a screw member having a generally helical external rib on the exterior thereof, said rib defining a generally helical external groove;
   a nut member having a passage therein, said nut member having a generally helical internal rib in said passage, said internal rib defining a generally helical internal groove;
   said screw member projecting into said passage with said external rib being received in said internal groove and with said internal rib being received in said external groove whereby relative rotation between said members causes relative translation between said members;
   at least a segment of said nut member being somewhat deformable;
   said ribs relatively tightly engaging each other substantially without backlash; and
   means for preloading said segment of said nut member both axially and radially of said nut member with sufficient force to deform said segment of said nut member to at least assist in obtaining the relatively tight engage-ment between the ribs.

2. An assembly as defined in claim 1 wherein said means for preloading includes a resilient deformable sleeve surrounding said nut member.

3. An assembly as defined in claim 1 including means substantially surrounding said nut member, said means for preloading including means for applying an axial compressive force to said segment of said nut member.

4. An assembly as defined in claim 1 wherein said nut member includes a core and said segment with said segment forming a lining for said core and being of a material which is more easily deformed than the material of said core, said lining being split along a line having an axial component, said lining being confined and preloaded by said nut.

5. An assembly comprising:
   a screw member having a generally helical external rib on the exterior thereof, said rib defining a generally helical external groove;
   a nut member having a passage therein, said nut member having an internal generally helical rib in said passage, said internal rib defining a generally helical internal groove;
   said screw member extending into said passage with said external rib being received in said internal groove and with said internal rib being received in said external groove whereby relative rotation between said members causes relative translation between said members;
   said external rib forming an interference fit with said internal rib;
   said ribs being capable of transmitting power, the rib of at least one of said members being somewhat deformable; and
   means at the opposite ends of said one member for axially preloading the somewhat deformable rib of said one member.

6. An assembly as defined in claim 5 wherein said last mentioned means includes an abutment at one end of said one member and a threaded stud at the other end of said one member which can be advanced toward said abutment to axially preload said one member.

7. An assembly as defined in claim 5 wherein said one member is said nut member and said assembly includes a rigid sleeve surrounding said nut member in close proximity thereto.

8. An assembly as defined in claim 7 wherein at least said segment of said nut member is constructed of Turcite B.

9. An assembly as defined in claim 7 wherein said last mentioned means includes retaining rings engaging the opposite ends of said nut member and affixed to said sleeve.

10. An assembly as defined in claim 7 wherein said last mentioned means includes a threaded stud and cooperating threads on said sleeve whereby said stud can be advanced toward one end of the nut member to axially preload the latter.

11. An assembly as defined in claim 7 wherein the radial outward deformation of the nut member as a result of the axial preload is limited by said sleeve.

12. An assembly as defined in claim 11 including a sleeve of resilient material between the rigid sleeve and the nut member.

13. An assembly as defined in claim 5 wherein at least the segment of said nut member defining the periphery of said internal rib includes a mixture of a plastic and a metal.

14. An assembly comprising:
   a screw member having a generally helical external rib on the exterior thereof, said rib defining a generally helical external groove;
   a nut member having a passage therein, said nut member having an internal generally helical rib in said passage, said internal rib defining a generally helical internal groove;
   said screw member extending into said passage with said external rib being received in said internal groove and with said internal rib being received in said external groove whereby relative rotation between said members causes relative translation between said members;

said external rib forming an interference fit with said internal rib;

said ribs being capable of transmitting power, the rib of the nut member being somewhat deformable; and means other than said screw member for preloading at least said rib of said nut member to thereby augment said interference fit.

15. An assembly as defined in claim 14 wherein said nut member includes a tubular core of relatively non-deformable material and a lining defining the periphery of said ribs of the nut member and being constructed of somewhat deformable material.

16. An assembly as defined in claim 15 wherein said lining includes at least first and second sections separated by a line having an axial component, said sections being oversize circumferentially relative to the core.

* * * * *

UNITED STATES PATENT OFFICE
CERTIFICATE OF CORRECTION

Patent No. 3,698,257     Dated October 17, 1972

Inventor(s) John W. Ballentine and Frank R. Chaffin

It is certified that error appears in the above-identified patent and that said Letters Patent are hereby corrected as shown below:

The name of the Assignee is changed to read:

W. S. SHAMBAN & CO.

Signed and sealed this 15th day of May 1973.

(SEAL)
Attest:

EDWARD M. FLETCHER, JR.     ROBERT GOTTSCHALK
Attesting Officer     Commissioner of Patents

FORM PO-1050 (10-69)